United States Patent [19]
Dodds

[11] Patent Number: 5,048,755
[45] Date of Patent: Sep. 17, 1991

[54] IRRIGATION SYSTEM

[75] Inventor: Graeme C. Dodds, 2 Frensham Place, Round Corner Dural, New South Wales, Australia, 2158

[73] Assignees: Graeme Charles Dodds; Kevin James Peacock; Peter Geoffrey McNeil, all of New South Wales, Australia

[21] Appl. No.: 509,550

[22] Filed: Apr. 16, 1990

[51] Int. Cl.⁵ .................. B05B 12/04; B05B 12/12
[52] U.S. Cl. ............................ 239/64; 239/68; 239/69; 239/70; 239/DIG. 15; 137/78.2
[58] Field of Search .............. 239/63, 64, 67–70, 239/DIG. 15; 137/78.2

[56] References Cited

U.S. PATENT DOCUMENTS

| | | | |
|---|---|---|---|
| 3,653,595 | 4/1972 | Greengard, Jr. et al. | 239/70 |
| 4,165,532 | 8/1979 | Kendall et al. | 364/420 |
| 4,209,131 | 6/1980 | Barash et al. | 239/60 |
| 4,244,022 | 1/1981 | Kendall | 364/420 |
| 4,541,563 | 9/1985 | Uetsuhara | 239/64 |
| 4,626,984 | 12/1986 | Unruh et al. | 364/132 |

FOREIGN PATENT DOCUMENTS

WO87/04275 7/1987 Australia .

Primary Examiner—Andres Kashnikow
Assistant Examiner—Karen B. Merritt
Attorney, Agent, or Firm—Townsend & Townsend

[57] ABSTRACT

An irrigation system for controlling the operation of a number of control valves each of which controls the flow of water in a corresponding branch pipe leading from a common supply pipe. The system comprises a pair of control lines which extend along the supply pipe and branch pipes to carry a control signal to operate a control unit which operates a corresponding control valve using a low voltage power supply. The control signal is coded by a data generator according to predetermined conditions and is decoded by each of the control units, the coded signal being received at each control unit, and the specified control unit operating only.

9 Claims, 3 Drawing Sheets

PRIOR ART - FIRST TYPE

FIG. 2. PRIOR ART - SECOND TYPE

IRRIGATION SYSTEM

BACKGROUND OF THE INVENTION

The present invention relates to irrigation systems for controlling the operation of a number of control valves each of which in turn controls the flow of water in a corresponding branch pipe leading from a common supply pipe.

Such irrigation systems are well known, however, the systems suffer from a number of disadvantages. The most significant disadvantage is that hitherto each control valve has been connected to a corresponding pair of wires which extend from a centralized location to the location of the control valve. For electrical safety reasons, these wires carry low voltage electrical power used to switch on and off the control valve. As a consequence, the wires must be of a substantial diameter in order to carry the necessary current required to operate the valve. As the number of control valves increases, so the length and number of the pairs of wires also correspondingly increases. This results in a substantial burden both in terms of the cost of supplying the wires which are made from expensive copper, and also in terms of laying the wires in or on the ground to be irrigated and the valuable space occupied by such wires.

SUMMARY OF THE INVENTION

It is the object of the present invention to provide an improved irrigation system that provides total water management and in which the number of wires, and particularly the number of power wires which carry a relatively high current, is reduced.

According to one aspect of the present invention there is disclosed an irrigation system for controlling the operation of a plurality of control valves each of which controls the flow of water in a corresponding branch pipe leading from a common supply pipe, said system characterised by a pair of low voltage power supply lines extending substantially along said supply pipe, a pair of control wires also extending along said supply pipe, a control data generator connected to said control wires, and a control unit corresponding to each of said control valves and located adjacent thereto, said control units being connected to the corresponding control valve, to said low voltage power lines, and to said control wires, and including decoding means to detect data transmitted over said control wires by said data generator which identifies a predetermined one of said control units and switch means activatable by said decoding means to connect or disconnect said corresponding control valve and said power lines to operate said corresponding control valve.

BRIEF DESCRIPTION OF THE DRAWINGS

An embodiment of the present invention will now be described with reference to the drawings in which.

DESCRIPTION OF THE PREFERRED EMBODIMENT

Figure 1:
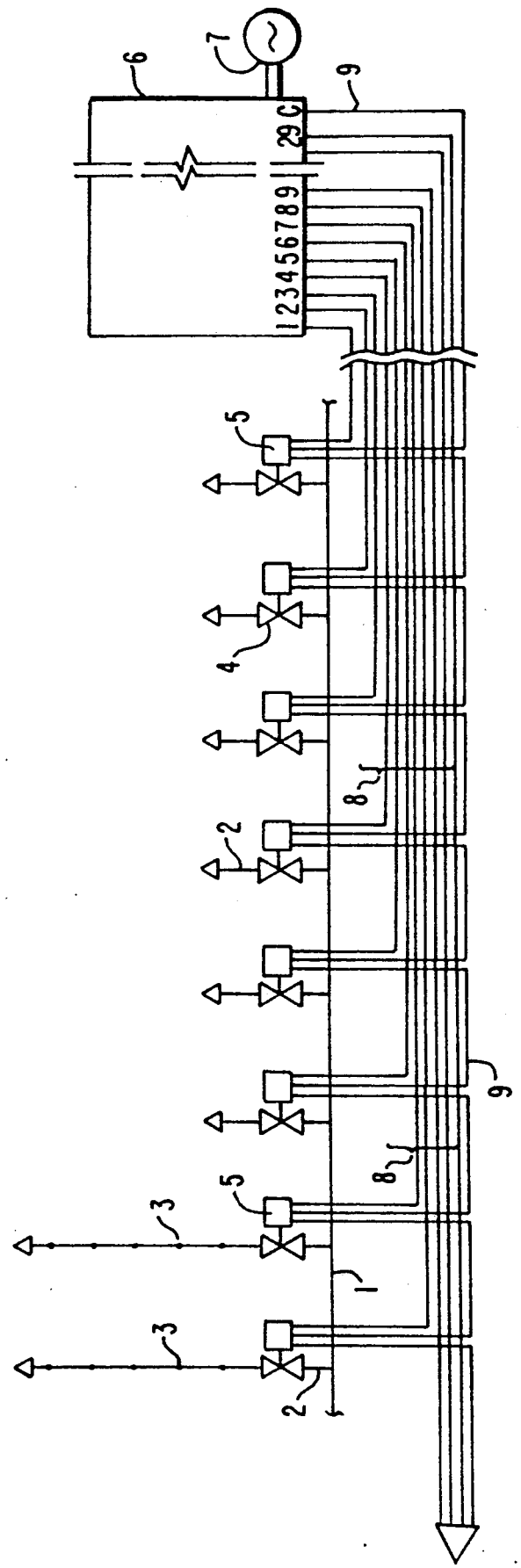
FIG. 1 is a schematic diagram illustrating a first prior art irrigation system.

The first type of prior art system is illustrated in FIG. 1. A common supply pipe 1 has a number of branch pipes 2 each of which includes a number of sprinklers, or like water emitting devices 3. A control valve 4 is located at the head of each branch pipe 2 and is operated by a solenoid 5 or like control device.

At a location remote from the various branch pipes 2 is a hardwired central controller 6 which is operated from a mains supply 7 and includes a low voltage power source (not illustrated) which supplies low voltage power to a large number of power control lines 8 which extend substantially alongside the supply pipe 1.

It will be apparent that each solenoid 5 is connected via a corresponding control line 8 to a corresponding output of the controller 6. In addition, the solenoid 5 is connected to a common line 9. In operation, in order to operate any one of the control valves 4, the corresponding control line 8 is energized thereby allowing current to flow along the corresponding control line 8, to the solenoid 5, and return to the controller 6 via the common line 9.

It will be appreciated that the above described system includes a number of drawbacks. The first is the large number of power control lines 8 each of which must be of a size sufficient to carry the operating current of a solenoid. The common line 9 must be of even heavier gauge wire. Since there is a control line 8 for each solenoid 5, there are a substantial number of wires to the system and therefore the total cost of both purchasing the wires, and laying same out, is high. In this connection it should be appreciated that the circuit diagram of FIG. 1 effectively reduces the distance between adjacent control valves 4 and therefore tends to de-emphasize the actual length of the control lines 8.

Figure 2:
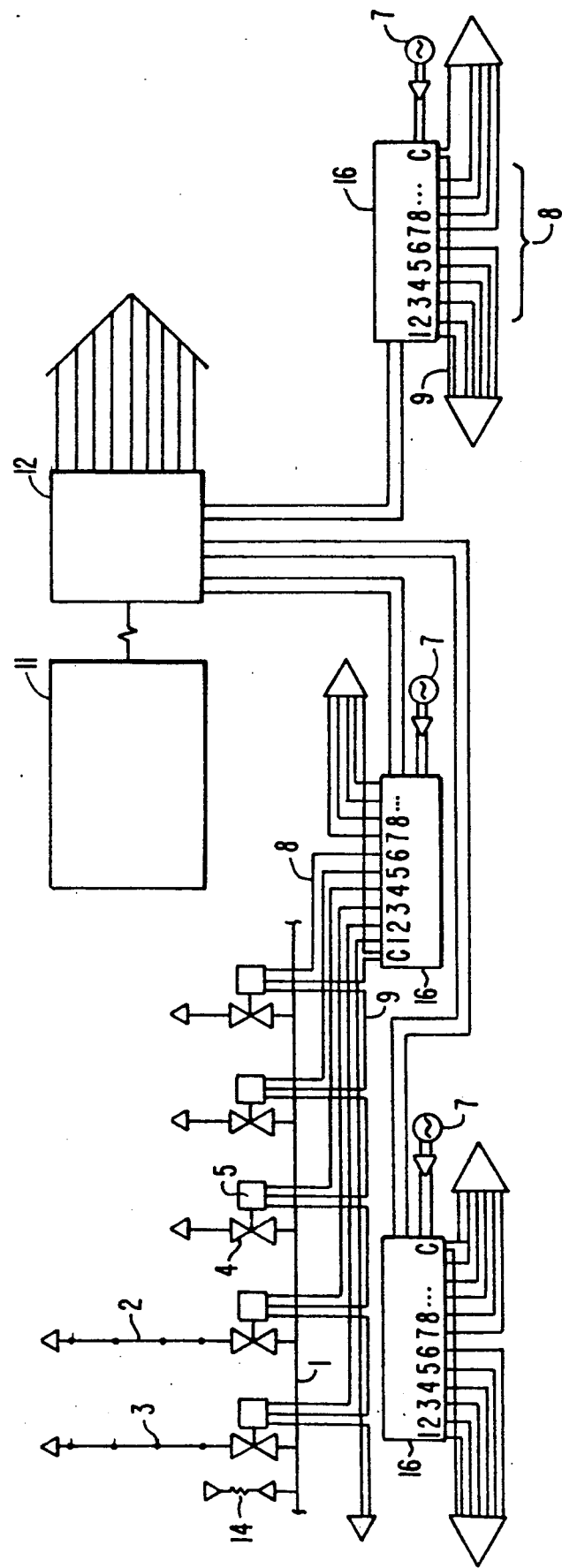
FIG. 2 is a similar diagram illustrating a second prior art system.

In order to overcome one of the limitations of the prior art system of FIG. 1, namely that the maximum extent of the supply pipe 1 is approximately 100 metres owing to the losses in the power control lines 8 and common line 9, the prior art system of FIG. 2 has been devised. In this prior art system, the system of FIG. 1 is essentially duplicated a number of times with the central controller 6 being replaced by a number of satellite controllers 16 each of which is supplied with electrical energy from the mains supply 7 and each of which has its own set of branch pipes 2, sprinklers 3, control valves 4 and solenoids 5 which again extend along the common supply pipe i. For clarity, only one set of branch pipes 2, sprinklers 3, control valves 4 and solenoids 5 are illustrated. Each of the satellite controllers 16 includes a corresponding set of power control lines 8 and a common line 9 as before.

At a central location are positioned a central controller 11 and an interface 12 which sends control signals to each of the satellite controllers 16. It will be appreciated that when one of the satellite controllers 16 is activated by the central controller 11 via the interface 12, then all the control valves 4 operated by that particular satellite controller 16 will be operated either simultaneously, or according to some predetermined sequential regime. This is fixed within the operating circuit of the satellite controller 16.

Because the diameter of the supply pipe 1 is not sufficient to operate all of the sprinklers 3 in the entire system, it is necessary to provide some degree of sequencing. If all the sprinklers 3 were operated simultaneously, the pressure within the supply pipe 1 would drop below an effective operating pressure. The necessary sequencing is obtained by sequencing the operation of the satellite controllers 16.

Other disadvantages of the arrangement illustrated in FIG. 2 include the inability to control individual valves 4 from the central location at which the controller 11 is located. The control of the individual valves 4 is governed by each of the satellites controllers 16 and if some change is required, then a journey to the individual satellite controller 16 is required for its adjustment. In addition, if an individual satellite 16 is faulty, then a large section of the irrigation system is out of service at the same time and this may result in the death of young plants during hot weather. Furthermore, there are often less control valves 4 within the vicinity of a satellite controller 16 than the satellite controller 16 is able to service. Accordingly, many of the available outputs on a given satellite controller 16 may not be used and therefore the substantial capital cost of these satellite controllers is under utilized.

The prior art described in FIG. 1 and FIG. 2 does not provide any method of allowing manual valves 14 to be operated at the same time as the valves 4. Also, if the manual valves 14 are to be operated at other times it would be necessary to start the pumps manually. The prior art systems only allow for one pump to be started by the control system.

Figure 3:
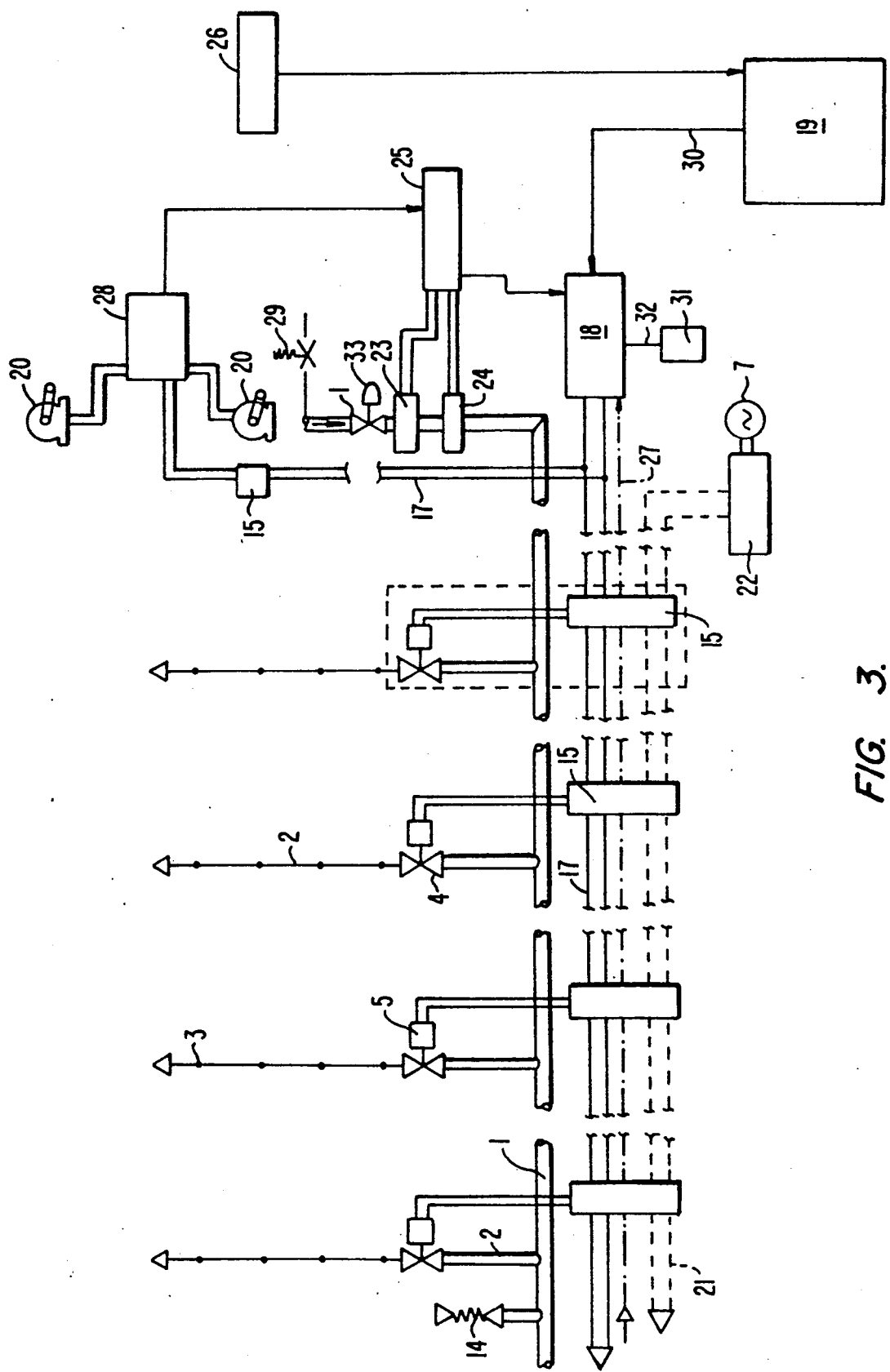
FIG. 3 is a similar diagram but illustrating the preferred embodiment of the present invention.

Turning now to FIG. 3, the preferred embodiment of the irrigation system of the present invention is shematically illustrated. The supply pipe 1, branch pipes 2, sprinklers 3, control valves 4 and solenoids 5 are substantially as before. In addition, manually operable valves 14 can also be provided and supplied from the supply pipe 1.

Directly connected with each solenoid 5 is a corresponding control unit 15 which, as indicated by the box illustrated in broken lines in FIG. 3, is in the immediate vicinity of the corresponding control valve 4. Each of the control units 15 is directly connected "in parallel" to "multi drop" control wires 17 such that each of the control units 15 receive all the information transmitted along the control wires 17 by an encoder 18 which is in turn supplied with data from a computer or central processing unit 29. In those systems where a pump is required to produce the necessary head of pressure for the supply pipe 1, the control wires 17 also extend to an appropriate control unit 15 which is directly connected with the system pumps 20 via the pump control unit 28 which in turn is connected to the data acquisition unit 25.

In addition, a pair of low voltage power supply lines 21 is also connected to each of the control units 15 which are again connected in parallel. The low voltage power lines 21 are supplied from the mains supply 7 via a transformer 22.

The use of separate control wires 17 and power lines 21 provide several features to increase the reliability of the system described in FIG. 3.

Any voltage may be applied to the valves 4 or other devices can be used in the system if required and a mixture of voltages and AC & DC current valves can be controlled from the same "multi-drop" control wire. The power lines 21 are electrically isolated from the control wires 17 so that power surges cannot effect the electronic circuits. Other forms of data transmission links can be used in place of the "wire cable", eg; optical fiber. This has considerable advantage in areas effected by lighting strikes. The control wires 17 require very low voltage and current for data transmission and therefore only require small gauge wire that can be extended for many kilometres from the encoder 18. The power lines 21 do not eminate from the central processing unit 19 or the encoder 18 and in large systems the power can be supplied from the various points in the system via transformers 22 thus reducing the length, size and cost of power lines while increasing the reliability and flexibility of the system.

Located in the supply pipe 1 are a flow transducer 23 and a pressure transducer 24 which supply data to a data acquisition unit 25. The pump control unit 28 is also connected to the data acquisition unit 25. The central processing unit 19 is preferably also supplied with data from a weather station 26. The output of the data acquisition unit 25 is supplied to the central processing unit 19 as an input via the encoder 18. Also connected to the supply pipe 1 is a pressure sustaining valve 29 and when required a master valve 33 is fitted.

Within each of the control units 15 is a decoder in order to detect which of the data transmitted along the common control wires 17 is intended for a particular control unit 15. The control unit 15 also includes a switching device which is able to be activated and deactivated by the decoder to respectively turn on and off the corresponding solenoid 5.

It will be apparent that the above described system has a number of constructional advantages. In particular, only the control wires 17 are required to extend along the supply pipe 1 so that there is a substantial saving in the volume of wire and the amount of time required to lay same. Also, as described before the control wires 17 are not sized to provide power to the valves 4 and the power lines 21 only need to follow the supply pipe 1 for short distances. In addition, the individual control units 15 are not very expensive and thus the overall capital cost of the system is not high. Clearly, if one of the control units 15 should be defective, then this interrupts the operation of only the corresponding branch pipe 2 and not a large number of branch pipes as is the case with a defective satellite controller 16 in the arrangement of FIG. 2.

In order to further enhance the reliability of the system simultaneous "feed-back" of the status of each valve 4 is made possible by the use of a separate "multi-drop" control wire 27 connected to each of the decoders 15 and the encoder 18. Other sensors may be connected to the decoder if required to provide local pressure and flow in the branch pipe 2 connected to each valve 4 and other local field conditions such as moisture, rain, wind etc in relation to each valve.

Furthermore, the system of FIG. 3 has a number of very substantial operational advantages. Since each of the control units 15 is able to be individually controlled via the central computer 19, this allows for great flexibility in the operation of the system. The individual control units 15 can be operated for a set time or for a set volume of water. Furthermore, the set time can be divided into a number of smaller periods of "on time" interspaced with periods of "off time" and these periods can be variable in duration so as to provide "controlled percipitation" or "layering" of the water supplied by each of the control valves 4. Thus providing considerable water savings and improving plant growth and deep rooting particularly in turf grasses.

Similarly, each of the control units 15 can be provided with an individual program cycle or, alternatively, a predetermined number of the control units 15 can each be operated from the same program cycle and operated simultaneously. When either an individual or a group program cycle starts, either because a preselected time or other condition has been reached or the weather station 26 indicates that a predetermined weather condition has been reached, then the individual control units 15 can be turned on in a predetermined priority order in which they were pre-selected in the program cycle. This procedure continues until the actual flow rate, as measured by the flow transducer 23, substantially reaches the available design flow rate determined by factors such as the diameter of the supply pipe 1, whilst maintaining a minimum predetermined design pressure as sensed by the pressure transducer 24.

Normally the number of branch pipes 2 far exceeds the capacity of the supply pipe 1 to simultaneously supply all the branch pipes with water. Thus, after a set on time has been achieved, or a correct volume has passed, or the first "layer" has been applied, the control units 15 which were initially turned on are turned off. Further control units 15 are then activated in a priority order thereby maximizing the number of control units operating at any given time but keeping the flow and pressure within the supply pipe 1 approximately at the available maximum design rates providing "automatic pump optimisation" and thus considerable energy savings.

Also, when multi-pump units 20 are used the pump control unit 28 will turn on only the necessary pumps in a pre-programmed order to provide the design flow rate for the current "program cycle".

By arranging to have a previously activated control unit 15 commencing a second or subsequent "layer" in such a way as to have priority over "new" control units 15 being activated for the first time, this provides automatic intersequential operation within the program cycles. Similarly, if the manually operable valves 14 are turned on, this will be sensed by the flow transducer 23 and the appropriate data transmitted via the data acquisition unit 25 to the computer 19. As a consequence, the lowest priority control units 15 can be sequentially turned off until the flow rate returns to its desired maximum value. The reversed procedure is followed when the manually operable valve(s) 14 is/are turned off. This provides "automatic flow compensation".

As the system reaches the end of a current "cycle" and the flow as determined by the flow transducer 23 falls below the maximum available, the pump(s) 20, when more than one is fitted, will be turned off in a pre-programmed order by the pump controller 28 until only one pump is operating. This pump 20 will continue to operate until maximum flow is detected by the flow transducer 23 which will start a time delay and activate the pressure sustaining valve 29 so as to maintain a set pressure in the main system pipe 1 and provide flow through the pump.

After the time delay has elapsed the pump will stop providing "automatic system pressurisation" of the main supply pipe 1 and the master valve will be closed by the pump control unit 28.

Automatic pressurisation of the supply pipe 1 by the control system provides several advantages. If the manual valves 14 are used when the system is "off" the pressure and flow will be detected by the transducers 23 and 24 and the pump(s) turned on to satisfy the flow demand of the manual outlet(s) 14. When the manual outlet(s) are turned off the procedure will be the same as described above for the end of a normal "cycle". Furthermore, automatic pressurisation of the main pipe i will detect leaks in the system as any pressure drop will be detected by the pressure transducer 24.

If the pressure rises above the normal set point the pressure transducer 24 will activate the pressure sustaining valve 29 to release the excessive pressure and close the valve when the pressure falls below the set point providing "automatic pressure compensation" of the supply pipe 1.

For increased reliability the encoder 18 is fitted with back-up memory in case the computer 19 or the communications link 30 should fail for any reason.

The communications link 30 is provided by a standard computer interface cable. However, as there are no controls on the encoder 18 the computer 19 can be located at any distance from the encoder 18 and the communication link provided by any of the existing methods such as telephone, radio, micro waves or optical fibers. Manual operater 31 is also connected by a communication link similar to 30 to provide field testing of the system.

The pump control unit 28 continually monitors the flow, pressure, temperature, motor status etc. of each pump via the data acquisition unit 25 and the encoder 18 to the computer 19 to report any malfunctions and or turn off faulty pumps.

Furthermore, the art of using a system that incorporates a "master" or "central" controller and some type of "satellite" or "slave" etc. controlled via a 2 wire system or radio link using some form of data encoding and decoding are well known for use in such diverse applications as irrigation systems to model train sets, however, previous attempts to use this technology in irrigation systems suffer from many disadvantages.

The prior art systems often provide a very complicated way of turning the valves "on" and "off" but fail to address the problem of TOTAL WATER MANAGEMENT. These systems have all types of inputs and sensors to monitor this and that and modify the current programme but these features make the system very difficult to programme and even more difficult to operate when several hundred or thousand control points or valves are connected.

Furthermore, as it is always necessary to operate several valves concurrently in large systems, often with different run times, and to overlap these times, all prior art systems fail to provide a method of "automatic pump (or supply) optimisation" where the available flow rate is automatically fully utilised irrespective of the number, flow rate or run time of the valves concurrently programmed to operate.

In addition the majority of agricultural and turf sprinklers on the market at the present time have a precipitation rate far in excess of the infiltration rate of the soil, this problem is much worse on sloping surfaces.

This problem is overcome by the present invention by providing "controlled precipitation" or "layering" via a process of "automatic intersequential control" over each control valve, permitting each valve to have individual total run times interspaced with individual programmed periods of "run" and "pause" periods to allow the water to infiltrate the soil. This is not a repeat cycle function as in many prior art systems. In the present invention each valve. or several valves at the one time, according to the available flow rate, are turned on in a priority order according to the current program cycle and as each valve commences a pause period other valves commence their "run" period. When the second phase of valves complete their first "layer" the system then gives priority to any valves from the first phase that require further layers if sufficient "pause" time has elapsed. This process continues until all valves have applied the number of "layers" required.

Also, the prior art does not include any method of providing "automatic flow compensation" to facilitate the above features or provide for the use of manual outlets when the system is operating or if automatic valves are manually operated. The present invention caters for both of these circumstances by the inclusion of a flow transducer as an intergrated part of the total control system.

The flow transducer provides real time flow to the computer which will then automatically turn off other valves to provide "automatic flow compensation".

In conjunction with the flow transducer a pressure transducer is also included as an integral part of the system to sense pressure drop in the system which will also activate the computer to reduce the number of valves currently open so the system maintains the optimum line pressure thus providing "automatic pressure compensation".

The pressure transducer is also used in conjunction with the pressure sustaining valve and pump control unit to provide "automatic system pressurisation" when the programmed cycle is completed. This has several advantages such as the prevention of air locks in the mains, water hammer reduction, separation of the water column in the mains, system control and response time is reduced, local flooding at sprinklers when mains are filling and overload prevention of pump motors when mains are filling. These matters are not addressed by the prior art.

The pump control unit is used to monitor the status of all the pumps installed in the system. It also monitors the number of pumps turned on for any cycle and the order in which they operate this provides "variable pump flow programming".

The preferred embodiment of the present invention address all the deficiencies of the prior art described herein by the hardware configuration and software developed to control the operation of the hardware and provide a total water management system.

The present invention consists of a conventional PC type computer as the programming device with special purpose custom designed software and on screen colour graphics to facilitate programming and operation.

The computer is in turn connected via an interface cable to a purpose built encoding unit. As this unit has no controls it can be placed remote from the computer if desired. In the field immediately adjacent to each control valve is located a low cost purpose built decoding device which is designed for direct burial and connecting these devices to the encoder is a single "multidrop" two or three core cable or optical fiber link may be used.

The pressure and flow transducer and the pump control unit are connected to the encoder via a data acquisition unit. The pressure sustaining valve and the master valve are connected to the pump control unit.

A full weather station can be provided if required and is connected directly to the computer via a standard interface cable. A socket is provided on the encoder to allow a manual operator to be attached when the computer is located remotely from the encoder.

The control system is completely isolated from the power circuit to operate the valves. This allows complete flexibility in the source, voltage, and current and provides for a mixture of each within the one control system if desired.

The preferred embodiment of the present invention provides the following unique features for control and total water management:
1. "CONTROLLED PERCIPITATION" or "LAYERING" of the water supplied by each of the control valves.
2. "AUTOMATIC INTER-SEQUENTIAL CONTROL" within each program cycle.
3. "AUTOMATIC PUMP OPTIMISATION" to maximise use of the available flow.
4. "AUTOMATIC FLOW COMPENSATION" to automatically adjust the system if manual flow conditions occur in the system.
5. "AUTOMATIC PRESSURE COMPENSATION" to automatically adjust the system to maintain optimum pressure in the main lines.
6. "AUTOMATIC SYSTEM PRESSURISATION" at the end of each program cycle to keep the main lines full and provide manual watering from the mains if required.
7. "VARIABLE PUMP FLOW" allows only the pumps necessary to meet the demand of the current program cycle to be programmed to operate.
8. "GRAPHICS PROGRAMMING INTERFACE" allows visual programming and operation with a mouse.

The present invention also has the following additional advantages:
1. The field units are completely concealed and therefore vandle proof.
2. Minimum amount of cable for maximum flexibility and reliability.
3. Very simple to operate via the graphics interface.
4. The PC computer can be located on an office desk remote from the system, there is no need to push buttons in the field.
5. As the PC computer is standard and is inexpensive it can be duplicated in large systems as a backup and repaired at the local computer shop. Other components are easy and inexpensive to replace in the field.
6. Very energy efficient as pumps are automatically kept at their optimum performance.
7. Water wasteage is minimised with the controlled-precipitation feature.
8. Water hammer system lag and local flooding are reduced by the automatic system pressurisation feature.

The foregoing describes some embodiments of the present invention and modifications, obvious to those skilled in the art, can be made thereto without departing from the scope of the present invention.

I claim:

1. An irrigation system for controlling the operation of a plurality of control valves each of which controls the flow of water in a corresponding branch pipe leading from a common supply pipe, characterised by a pair of low voltage power supply lines extending along said supply pipe, a pair of control lines also extending along said supply pipe, a control data generator connected to said control lines, and a control unit corresponding to each of said control valves and located adjacent thereto, said control units being connected to the corresponding control valve, to said low voltage power supply, and to said control lines, and including decoding means to detect data transmitted over said control lines by said data generator which identifies a predetermined one of said control units and switch means activatable by said decoding means to connect or disconnect said corresponding control valve and said power supply to operate said corresponding control valve.

2. The system as claimed in claim 1, wherein the control lines include a chosen one of wire cables and optical fibers.

3. The system as claimed in claim 1, said data generator comprises data acquisition means, data storage means, and programming means to generate said data according to a predetermined priority.

4. The system as claimed in claim 3, wherein said predetermined priority is at least one of a watering operation and ambient weather condition.

5. The system as claimed in claim 4, wherein the available flow rate of water in said common supply pipe is varied according to an optimisation use by at least one of said programming means and a flow sensing means.

6. The system as claimed in claim 5, wherein after a pressure drop in said system is detected, at least one of said programming means and a pressure sensing means provides data to disconnect corresponding control valves as required to maintain optimal pressure in supply pipe.

7. The system as claimed in claim 6, wherein the system includes extra manually operated valves which when operated the flow in said supply line is varied according to data received from said flow sensing means and pressure sensing means.

8. The system as claimed in claim 3 wherein the programming means provides at least two intersequential cycles within each watering schedule.

9. The system as claimed in claim 1, wherein at least two pumps supply variable flow according to program requirements of the watering operation.

* * * * *